US009002363B2

(12) United States Patent
Ashraf et al.

(10) Patent No.: US 9,002,363 B2
(45) Date of Patent: Apr. 7, 2015

(54) BASE STATION, METHOD AND COMPUTER PROGRAM PRODUCT

(75) Inventors: Imran Ashraf, Swindon (GB); Holger Claussen, Straffan (IE)

(73) Assignee: Alcatel Lucent, Boulogne-Billancourt (FR)

( * ) Notice: Subject to any disclaimer, the term of this patent is extended or adjusted under 35 U.S.C. 154(b) by 103 days.

(21) Appl. No.: 13/394,836

(22) PCT Filed: Jul. 22, 2010

(86) PCT No.: PCT/EP2010/004585
§ 371 (c)(1),
(2), (4) Date: Jul. 23, 2012

(87) PCT Pub. No.: WO2011/029497
PCT Pub. Date: Mar. 17, 2011

(65) Prior Publication Data
US 2012/0282979 A1 Nov. 8, 2012

(30) Foreign Application Priority Data

Sep. 10, 2009 (EP) .................................... 09360041

(51) Int. Cl.
*H04W 72/00* (2009.01)
*H04W 16/26* (2009.01)
*H04W 16/08* (2009.01)
(52) U.S. Cl.
CPC .............. *H04W 16/26* (2013.01); *H04W 16/08* (2013.01)
USPC ......................................... 455/446; 455/453
(58) Field of Classification Search
USPC ................................ 455/446–453
See application file for complete search history.

(56) References Cited

U.S. PATENT DOCUMENTS 7,162,250 B2 * 1/2007 Misra ............................ 455/453
8,169,933 B2 * 5/2012 Srinivasan et al. ............ 370/253
(Continued)

FOREIGN PATENT DOCUMENTS

| CN | 1559112 A | 12/2004 |
| GB | 2 445 988 A | 7/2008 |

(Continued)

OTHER PUBLICATIONS

International Search Report for PCT/EP2010/004585 dated Oct. 5, 2010.

*Primary Examiner* — Simon Nguyen
(74) *Attorney, Agent, or Firm* — Fay Sharpe LLP

(57) ABSTRACT

A base station, a method and a computer program product are disclosed. The base station is operable, in concert with other base stations within a group, to support wireless communications with user equipment. The base station comprises: transmission logic operable to generate a cell having a coverage area supporting wireless communications with user equipment; reception logic operable to receive load information indicative of a user equipment communications load experienced by base stations within said group; and coverage area adjustment logic operable to determine changes required to said coverage area to change a user equipment communications load experienced by at least one base station within said group. In this way, it can be seen that each base station within the group may receive information about the user loading on other base stations within that group and is able to adjust its coverage area to cause that communications loading to be rebalanced to enable efficient use of resources and optimize the overall performance of each of the base stations within the group. The group of base stations with co-ordinated and optimized coverage can achieve higher end user data rates and improved quality of service than would otherwise be possible.

13 Claims, 5 Drawing Sheets

(56) References Cited

U.S. PATENT DOCUMENTS

| | | |
|---|---|---|
| 2004/0229621 A1 | 11/2004 | Misra |
| 2005/0152320 A1* | 7/2005 | Marinier et al. ............... 370/338 |
| 2006/0142021 A1* | 6/2006 | Mueckenheim et al. ...... 455/453 |
| 2008/0181184 A1* | 7/2008 | Kezys ........................... 370/338 |
| 2009/0253458 A1* | 10/2009 | Dillinger et al. ............ 455/552.1 |
| 2009/0325624 A1* | 12/2009 | Centonza ....................... 455/522 |
| 2010/0075683 A1* | 3/2010 | Johansson et al. ............ 455/446 |
| 2011/0014925 A1* | 1/2011 | Antic et al. ................. 455/452.2 |
| 2012/0028629 A1* | 2/2012 | Liu et al. ..................... 455/422.1 |

FOREIGN PATENT DOCUMENTS

| | | |
|---|---|---|
| KR | 10-2008-0018266 | 2/2008 |
| WO | 2005/069519 | 7/2005 |
| WO | WO 2009/029409 A1 | 3/2009 |

* cited by examiner

BASE STATION, METHOD AND COMPUTER PROGRAM PRODUCT

FIELD OF THE INVENTION

The present invention relates to a base station, a method and a computer program product.

BACKGROUND

In a cellular wireless telecommunications system, radio coverage is provided by areas known as cells. A base station is located in each cell to provide the radio coverage area. Traditional base stations provide coverage in relatively large geographical areas and these cells are often referred to as macro cells. It is possible to provide smaller sized cells, often within a macro cell. Such smaller sized cells are sometimes referred to as micro cells, pico cells or femto cells. Such small cells are typically established by providing a small cell base station that provides radio coverage having a relatively limited range within the radio coverage area of a macro cell. The transmission power of the small cell base station is relatively low and, hence, each small cell provides a smaller coverage area compared to that of a macro cell and covers, for example, an office or a home. A group of such small cell base stations may together provide a wireless small cell network.

Such small cells are typically provided where the communications coverage provided by the macro cell is poor or where a user wishes to use an alternative communications link provided locally, by the small cell base station, to communicate with the core network. Such a situation might arise where, for example, a user has a pre-existing communications link and the user wishes to utilise that link in preference to that provided by a macro cell network provider to communicate with the core network. The group of small cell base stations providing the wireless small cell network can together provide extended local coverage to user equipment throughout, for example, a home or an office building by using multiple small cell base stations distributed throughout those buildings which enables each of those base stations to transmit at a lower power than would otherwise be necessary if coverage was to be provided by a single small cell base station.

However, the proliferation of the deployment of base stations makes the control of base stations difficult to achieve.

Accordingly, it is desired to provide an improved technique for controlling base stations.

SUMMARY

According to a first aspect there is provided a base station operable, in concert with other base stations within a group, to support wireless communications with user equipment, the base station comprising: transmission logic operable to generate a cell having a coverage area supporting wireless communications with user equipment; reception logic operable to receive load information indicative of a user equipment communications load experienced by base stations within the group; and coverage area adjustment logic operable to determine changes required to the coverage area to change a user equipment communications load experienced by at least one base station within the group.

The first aspect recognises that radio coverage optimisation of base stations is an important element in improving the overall performance of each of the base stations within a group. A group of base stations with co-ordinated and optimised coverage can achieve higher end user data rates and improved quality of service than would otherwise be possible. However, the first aspect also recognises that achieving optimised coverage requires careful trade-offs to be made in order to accommodate conflicting objectives. Furthermore, since the network provider may have little or no control over the exact locations of each individual base station, the first aspect recognises that coordinating the coverage areas becomes difficult to achieve.

Existing techniques for coverage optimisation generally utilise centralised computation approaches to determine base station configurations for the network. However, the first aspect recognises that utilising such an approach would require each base station to communicate with a central entity which would significantly increase the amount of signalling data being transmitted throughout the network. Also, such an approach would require either accurate information on the location and configuration of the base stations to be provided by the installer of that base station or complex functionality to be provided in the base stations to enable those base stations to provide that information automatically. However, if that information is inaccurate or incomplete, then optimisation of coverage areas may not be possible to achieve. Accordingly, a technique is provided where distributed joint coverage optimisation is achieved between base stations. Although this technique has particular utility to base stations deployed in wireless small cell networks, it will be appreciated that similar functionality would also be beneficial in other base stations or network nodes such as, for example, macro base stations.

Hence, a base station is provided which may operate together with other base stations within a group such as, for example, a wireless small cell network, to support wireless communications with user equipment. Transmission logic is provided which may generate a cell such as, for example, a macro cell, micro cell, pico cell or femto cell which has a coverage area which supports wireless communications with user equipment. Reception logic is provided which may receive information regarding the communications load being experienced by other base stations within the group. Coverage area adjustment logic is provided which may determine those changes required to the coverage area to vary the communications load experienced by base stations within the group. In this way, it can be seen that each base station within the group may receive information about the user loading on other base stations within that group and is able to adjust its coverage area to cause that communications loading to be rebalanced to enable efficient use of resources and optimise the overall performance of each of the base stations within the group. By co-ordinating within the group, the need to obtain and communicate accurate configuration and location information to a central entity is obviated. Instead, optimised coverage can be achieved through trade-offs made locally to accommodate conflicting local objectives. It will be appreciated that the load information may be obtained from neighbouring base stations within the group either directly or via another network node such as, for example, a gateway or may be obtained from measurement reports communicated by the user equipment. The group of base stations with co-ordinated and optimised coverage can achieve higher end user data rates and improved quality of service than would otherwise be possible.

In one embodiment, the coverage area adjustment logic is operable to determine changes required the coverage area within a predetermined range bounded by an upper and lower threshold. Hence, the extent to which changes can be made may generally be restricted to within a particular range to help improve the stability and convergence of the overall system.

In one embodiment, the coverage area adjustment logic is operable, when the user equipment communications load supported by the base station is below an average user equipment communications load for the group but fails to exceed a predetermined maximum user equipment communications load supportable by the base station, to increase the coverage area to no more than a maximum coverage area defined by the upper threshold of the predetermined range to increase the user equipment communications load experienced by the base station. Accordingly, should it be determined that the load currently being supported by the base station is less than the maximum load which the base station can support and is also less than the average load for base stations within that group, then this is likely to indicate that that the base station still has capacity to take on more load and that other base stations are carrying more than their fair share of load. Hence, the coverage area of that base station may be increased. Increasing the coverage area is likely to cause user equipment which currently exerts a communications load on a neighbouring base station to handover to this base station thereby rebalancing the load on base stations within the group. Also, by ensuring that the increase in coverage does not exceed the maximum threshold, the maximum coverage area of that base station can be restrained to prevent any one base station unnecessarily dominating an area which may otherwise cause a detrimental effect on the overall performance of the network.

In one embodiment, the coverage area adjustment logic is operable, when the user equipment communications load experienced by the base station is above an average user equipment communications load for the group and exceeds a predetermined maximum user equipment communications load supportable by the base station, to decrease the coverage area to decrease the user equipment communications load experienced by the base station. Accordingly, should it be determined that the load currently being supported by the base station exceeds the maximum load which the base station can support and is also above the average load of base stations within the group, then this is likely to indicate that that the base station still has no capacity to take on more load and that other base stations are carrying less than their fair share of load. Hence, the coverage area of that base station is decreased. Decreasing the coverage area of the base station is likely to cause user equipment exerting a load on that base station to handover to another base station within that group, again rebalancing the load between base stations within the group.

In one embodiment, the coverage area adjustment logic is operable, when the decrease in the coverage area is to below the lower threshold, to reduce the lower threshold. It will be appreciated that if the decreased coverage area provides a coverage area which is less that the lower threshold, then it is likely that the lower threshold may be too high for the currently loading since that base stations is exceeding its capacity and supporting more user load than others within the group. By reducing the lower threshold, the coverage area may be reduced to an amount which enables reasonable operation of that base station and helps to rebalance the loading.

In one embodiment, the coverage area adjustment logic is operable, when the user equipment communications load experienced by the base station is above an average user equipment communications load for the group but fails to exceed a predetermined maximum user equipment communications load experienced by the base station and when base stations identified from the load information as being candidates to support user equipment communications load which would no longer be supported by the base station fail to exceed a predetermined maximum user equipment communications load supportable by those base stations, to decrease the coverage area to no less than a minimum coverage area defined by the lower threshold of the predetermined range to decrease user equipment communications load experienced by the base station. Accordingly, it is determined whether the current loading on the base station is less than the maximum loading for that base station but exceeds the average loading for the group, thereby indicating that the base station is more heavily loaded than it need be. However, rather than simply decrease its coverage area, a further determination is made as to whether those base stations which would experience an increase in load should be coverage area of this base station be reduced have the capacity to take on that additional load. Only if those base stations do have the capacity to take the additional load may the coverage area be decreased. Otherwise, no changes in the coverage area may be made since the base station still has sufficient capacity to accommodate the additional loading. In this way it can be seen that a decrease in coverage area may only occur when it is not overly detrimental to do so to other base stations within the group.

In one embodiment, the reception logic is operable to receive receiver sensitivity information indicative of a sensitivity of receivers of user equipment supported by base stations within the group and the coverage area adjustment logic is operable to determine from the receiver sensitivity information whether the decrease to the coverage area would cause user equipment communications load to no longer be supported by the base stations within the group and, if so, to prevent the decrease. Accordingly, information regarding the sensitivity of receivers of the user equipment being supported by base stations within the group may be provided. It will be appreciated that this information may be provided by the user equipment themselves and communicated to base stations either directly, via the base stations to which the user equipment are attached, or via some other network node. A decrease in the coverage area of the base station may be prevented should it be determined from the receiver sensitivity information that doing so would cause user equipment to no longer be supported by the base stations within the group. It will be appreciated that if that would be allowed to occur, then either the user equipment would experience a dropped call or this may cause the user equipment to be handed back to any overlying cell such as, for example, a macro cell within which the group is located.

In one embodiment, the load information indicative of a user equipment communications load experienced by base stations within the group comprises information indicative of numbers of user equipment supported by the base stations within the group and the coverage area adjustment logic is operable to determine changes required to the coverage area by changing its pilot channel transmission power to change the user equipment communications load experienced by at least one base station within the group by changing numbers of users supported by the at least one base station within the group. Accordingly, the number of user equipment supported by the base stations may be provided. Changes in the pilot transmission power level may be utilised to vary the coverage area. It will be appreciated that increasing or decreasing the pilot channel transmission power may cause the number of user equipment being supported by base stations to be increased or decreased.

In one embodiment, the predetermined range bounded by an upper and lower threshold comprises a predetermined pilot channel transmission power range bounded by an upper pilot channel transmission power threshold and a lower pilot channel transmission power threshold. Accordingly, upon receiving user load information from each of its neighbouring base stations, the base station may compute the average user load shared by all base stations. The difference between the base station's current load and the average load shared by all the base stations represents a target number of users to be adjusted within its coverage area. The base station may then adjust its pilot transmission power (and consequentially its coverage) within the threshold of the minimum pilot transmission power and the maximum transmission power to acquire or handover the desired number of users to or from other base stations. The maximum pilot transmission power threshold is typically fixed and depends on how much of the total base station transmission power is allocated to the pilot channel by the network operator, whereas the lower threshold may be varied to suit the individual operating conditions of that base station.

In one embodiment, the coverage area adjustment logic is operable, when the number of user equipment supported by the base station is below an average number of user equipment supported by base stations within the group but fails to exceed a predetermined maximum number of user equipment supportable by the base station, to increase the coverage area to no more than a maximum coverage area defined by the upper threshold of the predetermined range to increase the number of user equipment supported by the base station. By increasing the pilot channel transmission power it is likely that user equipment which are currently being supported by other base stations within the group may handover to that base station, thereby reducing the number of user equipment being supported by those other base stations and increasing the number or user equipment being supported by this base station. Also, by increasing the pilot channel transmission power any coverage holes which may otherwise exist can be filled.

In one embodiment, the coverage area adjustment logic is operable, when the number of user equipment supported by the base station is above an average number of user equipment supported by base stations within the group and exceeds a predetermined maximum number of user equipment supportable by the base station, to decrease the coverage area to decrease the number of user equipment supported by the base station. By decreasing the pilot channel transmission power it is likely that user equipment which are currently being supported by that base station may handover to other base stations within the group, thereby reducing the number of user equipment being supported by that base station and increasing the number or user equipment being supported by other base stations within the group. Also, decreasing the pilot channel transmission power helps to minimise any coverage overlap which may exist between neighbouring base stations.

In one embodiment, the coverage area adjustment logic is operable, when the number of user equipment supported by the base station is above an average number of user equipment supported by base stations within the group but fails to exceed a predetermined maximum number of user equipment supportable the base station and when base stations identified from the information indicative of numbers of user equipment supported by the base stations as being candidates to support user equipment which would no longer be supported by the base station fail to exceed a predetermined maximum number of user equipment supportable by those base stations, to decrease the coverage area to no less than a minimum coverage area defined by the lower threshold of the predetermined range to decrease the number of user equipment supported by the base station.

In one embodiment, the reception logic is operable to receive an indication of quality of service provided to user equipment supported by the base station and the coverage area adjustment logic is operable to adjust the lower threshold of the predetermined range to vary the minimum coverage area definable by the predetermined range in response to the indication. By utilising a measured coverage metric such as, for example, the quality of service, over a specified amount of time, an assessment can be made of the overall coverage provided by the base stations within the group to help minimise coverage holes and/or overlap.

In one embodiment, the coverage area adjustment logic is operable to perform at least one of: when the indication of quality of service indicates that less than or equal to a predetermined quality of service is being provided to user equipment supported by the base station, to increase the lower threshold of the predetermined range by a first predetermined amount; and when the indication of quality of service indicates that greater than a predetermined quality of service is being provided to user equipment supported by the base station, to decrease the lower threshold of the predetermined range by a second predetermined amount. Accordingly, the threshold may be incremented to help to remove coverage holes whilst the threshold may be decremented to help to minimise any coverage overlap. It will be appreciated that a base station's coverage area may typically be the geographical region where its transmitted signal can be received by user equipment at a signal strength that is greater than some specified threshold. A coverage gap represents the area where the received base station signal is typically below the specified threshold, whereas a coverage overlap denotes the region where two or more base stations signals are received by user equipment above the specified threshold.

In one embodiment, the first predetermined amount is greater than the second predetermined amount. Setting the decrement step to be much lower than the increment step helps to ensure that the coverage is dominated by the increment step and that coverage is decreased gradually. Accordingly, the base station may monitor the value of a coverage metric (for example a metric incorporating the users call drop probability or a coverage overlap coefficient) over a specified amount of time. If the measured value of the specified metric exceeds a corresponding maximum allowable threshold, then the base station's minimum pilot transmission power threshold may be increased typically by a fixed step size. However, if the measured metric value is less than the maximum allowable threshold, then the base station's minimum pilot transmission power threshold may be reduced gradually.

In one embodiment, the coverage area adjustment logic is operable to assess whether changes are required to the lower threshold based on the indication of quality of service less frequently than whether changes are required to the coverage area based on the load information. Accordingly, the rate at which the lower threshold is assessed may be much lower that the rate at which the coverage area is assessed to help improve convergence of the system. Accordingly, the minimum pilot transmission power threshold is set adaptively by the algorithm which runs individually on each base station and consists of two update cycles, a more frequent pilot transmission power update, which achieves user load balancing, and a less frequent minimum pilot transmit power threshold update to minimise coverage holes and overlap.

According to a second aspect of the present invention, there is provided a method, comprising the steps of: generating a cell having a coverage area supporting wireless communications with user equipment; receiving load information indicative of a user equipment communications load experienced by base stations operating in concert with other base stations within a group to support wireless communications with user equipment; and determining changes required to the coverage area to change a user equipment communications load experienced by at least one base station within the group.

In one embodiment, the step of determining comprises: determining changes required the coverage area within a predetermined range bounded by an upper and lower threshold.

In one embodiment, the step of determining comprises: when the user equipment communications load supported by the base station is below an average user equipment communications load for the group but fails to exceed a predetermined maximum user equipment communications load supportable by the base station, increasing the coverage area to no more than a maximum coverage area defined by the upper threshold of the predetermined range to increase the user equipment communications load experienced by the base station.

In one embodiment, the step of determining comprises: when the user equipment communications load experienced by the base station is above an average user equipment communications load for the group and exceeds a predetermined maximum user equipment communications load supportable by the base station, decreasing the coverage area to decrease the user equipment communications load experienced by the base station.

In one embodiment, the step of determining comprises: when the decrease in the coverage area is to below the lower threshold, reducing the lower threshold.

In one embodiment, the step of determining comprises: when the user equipment communications load experienced by the base station is above an average user equipment communications load for the group but fails to exceed a predetermined maximum user equipment communications load experienced the base station and when base stations identified from the load information as being candidates to support user equipment communications load which would no longer be supported by the base station fail to exceed a predetermined maximum user equipment communications load supportable by those base stations, decreasing the coverage area to no less than a minimum coverage area defined by the lower threshold of the predetermined range to decrease user equipment communications load experienced by the base station.

In one embodiment, the step of receiving comprises: receiving receiver sensitivity information indicative of a sensitivity of receivers of user equipment supported by base stations within the group and the step of determining comprises: determining from the receiver sensitivity information whether the decrease to the coverage area would cause user equipment communications load to no longer be supported by the base stations within the group and, if so, to prevent the decrease.

In one embodiment, the load information indicative of a user equipment communications load experienced by base stations within the group comprises information indicative of numbers of user equipment supported by the base stations within the group and the step of determining comprises: determining changes required to the coverage area by changing its pilot channel transmission power to change the user equipment communications load experienced by at least one base station within the group by changing numbers of users supported by the at least one base station within the group.

In one embodiment, the predetermined range bounded by an upper and lower threshold comprises a predetermined pilot channel transmission power range bounded by an upper pilot channel transmission power threshold and a lower pilot channel transmission power threshold.

In one embodiment, the step of determining comprises: when the number of user equipment supported by the base station is below an average number of user equipment supported by base stations within the group but fails to exceed a predetermined maximum number of user equipment supportable by the base station, increasing the coverage area to no more than a maximum coverage area defined by the upper threshold of the predetermined range to increase the number of user equipment supported by the base station.

In one embodiment, the step of determining comprises: when the number of user equipment supported by the base station is above an average number of user equipment supported by base stations within the group and exceeds a predetermined maximum number of user equipment supportable by the base station, decreasing the coverage area to decrease the number of user equipment supported by the base station.

In one embodiment, the step of determining comprises: when the number of user equipment supported by the base station is above an average number of user equipment supported by base stations within the group but fails to exceed a predetermined maximum number of user equipment supportable the base station and when base stations identified from the information indicative of numbers of user equipment supported by the base stations as being candidates to support user equipment which would no longer be supported by the base station fall to exceed a predetermined maximum number of user equipment supportable by those base stations, decreasing the coverage area to no less than a minimum coverage area defined by the lower threshold of the predetermined range to decrease the number of user equipment supported by the base station.

In one embodiment, the step of receiving comprises: receiving an indication of quality of service provided to user equipment supported by the base station and the step of determining comprises: adjusting the lower threshold of the predetermined range to vary the minimum coverage area definable by the predetermined range in response to the indication.

In one embodiment, the step of determining comprises at least one of: when the indication of quality of service indicates that less than or equal to a predetermined quality of service is being provided to user equipment supported by the base station, increasing the lower threshold of the predetermined range by a first predetermined amount; and when the indication of quality of service indicates that greater than a predetermined quality of service is being provided to user equipment supported by the base station, decreasing the lower threshold of the predetermined range by a second predetermined amount.

In one embodiment, the first predetermined amount is greater than the second predetermined amount.

In one embodiment, the step of determining comprises assessing whether changes are required to the lower threshold based on the indication of quality of service less frequently than whether changes are required to the coverage area based on the load information.

According to a third aspect of the present invention, there is provided a computer program product operable, when executed on a computer, to perform the method steps of the second aspect.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
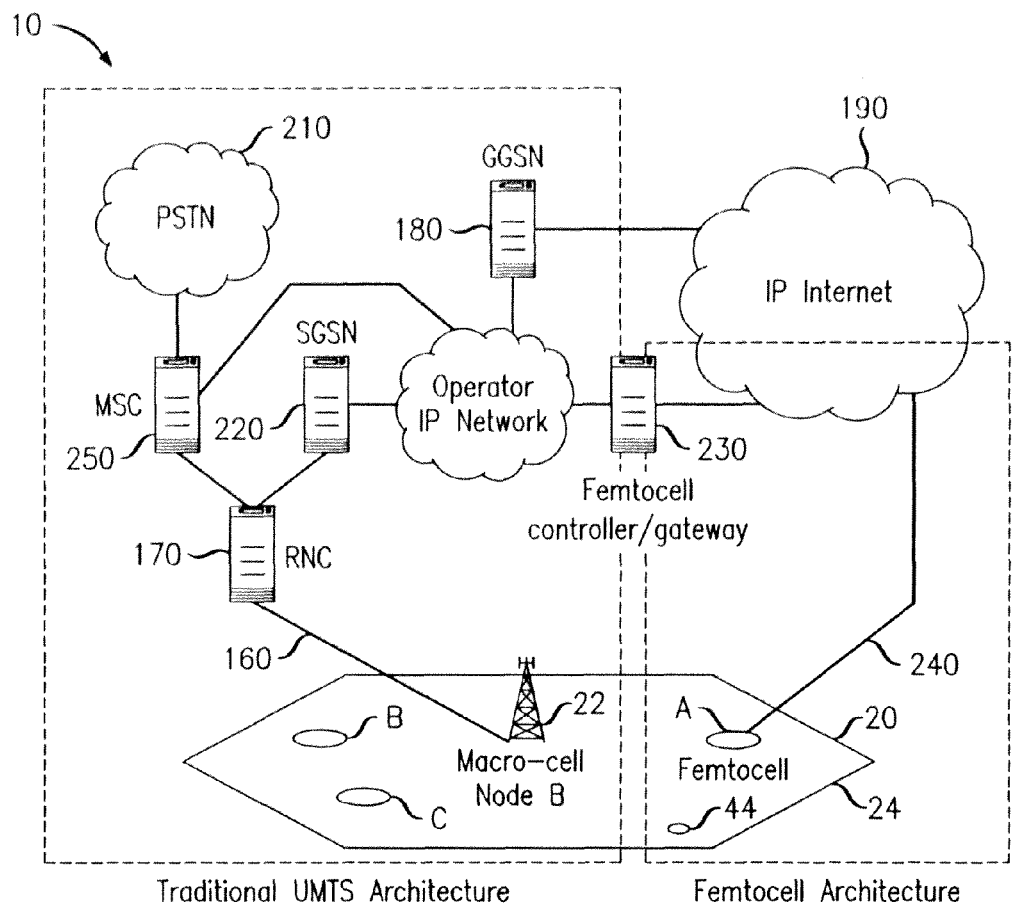
FIG. 1 illustrates the main components of a telecommunications network according to one embodiment.

FIG. 1 illustrates a wireless communication system, generally 10, according to one embodiment. User equipment 44 roam through the wireless communication system 10. Base stations 22 are provided which support respective macro cells 24. A number of such base stations are provided, which are distributed geographically in order to provide a wide area of coverage to the user equipment 44. When user equipment 44 is within a macro cell 24 supported by the base station 22 then communications may be established between the user equipment 44 and the base station 22 over an associated radio link. Each base station typically supports a number of sectors. Typically, a different antenna within a base station supports an associated sector. Of course, it will be appreciated that FIG. 1 illustrates a small subset of the total number of user equipment and base stations that may be present in a typical communications system.

The wireless communication system 10 is managed by a radio network controller 170. The radio network controller 170 controls the operation of the wireless communications system 10 by communicating with the base stations 22 over a backhaul communications link 160. The network controller 170 also communicates with the user equipment 44 via their respective radio links in order to efficiently manage the wireless communication system 10.

The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. Hence, a mobile switching centre 250 is provided with which the radio network controller 170 may communicate. The mobile switching centre 250 then communicates with a circuit-switched network such as a public switched telephone network (PSTN) 210. Likewise, the network controller 170 communicates with service general packet radio service support nodes (SGSNs) 220 and a gateway general packet radio support node (GGSN) 180. The GGSN then communicates with a packet-switch core 190 such as, for example, the Internet.

Figure 2:
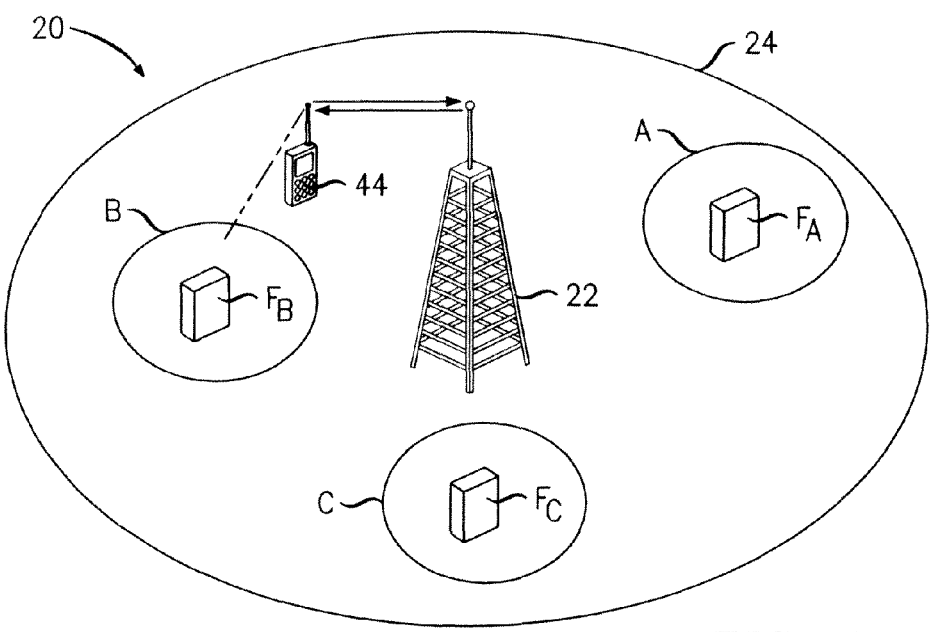
FIG. 2 illustrates a general femto cell deployment within one macro cell shown in FIG. 1.

As shown in more detail in FIG. 2, there are provided small cell base stations, in this example femto cell base stations $F_A$ to $F_C$, each of which provides a femto cell A to C in the vicinity of a building within which the associated femto cell base station is installed. The femto cells A to C provide local communications coverage for a user in the vicinity of those buildings. Each femto cell base station $F_A$ to $F_C$ communicates via a femtocell controller/gateway 230. A handover or camping event occurs between the base station 22 and the femto cell base stations $F_A$ to $F_C$ when the femto base stations $F_A$ to $F_C$ detect that user equipment comes within range. The femto cell base stations $F_A$ to $F_C$ typically utilise the user's broadband Internet connection 240 (such as ADSL, Cable, Ethernet, etc.) as a backhaul.

Femto cell base stations $F_A$ to $F_C$ are lower-power, low-cost, user-deployed base stations that provide a high cellular quality of service in residential or enterprise environment. In contrast to current macro cell approaches where complex and highly reliable base stations are deployed to strategic locations decided by the network owner, the femto cell base stations $F_A$ to $F_C$ are provided locally by customers. Such femto cell base stations $F_A$ to $F_C$ provide local coverage in areas of the macro network where quality of service may be low. Hence, the femto cell base stations $F_A$ to $F_C$ provide for improved quality of service in areas which are difficult for network operators. To reduce the cost of the femto base stations $F_A$ to $F_C$ and to reduce complexity and interference effects of the femto cell on other user equipment within the macro cell, the transmission power of the femto cell base station $F_A$ to $F_C$ is relatively low in order to restrict the size of the femto cell to a range of tens of metres or less. The femto cell base stations $F_A$ to $F_C$ have extensive auto-configuration and self-optimisation capability to enable a simply plug-and-play deployment. As such, they are designed to automatically integrate themselves into an existing macro cellular wireless network 10.

Figure 3:
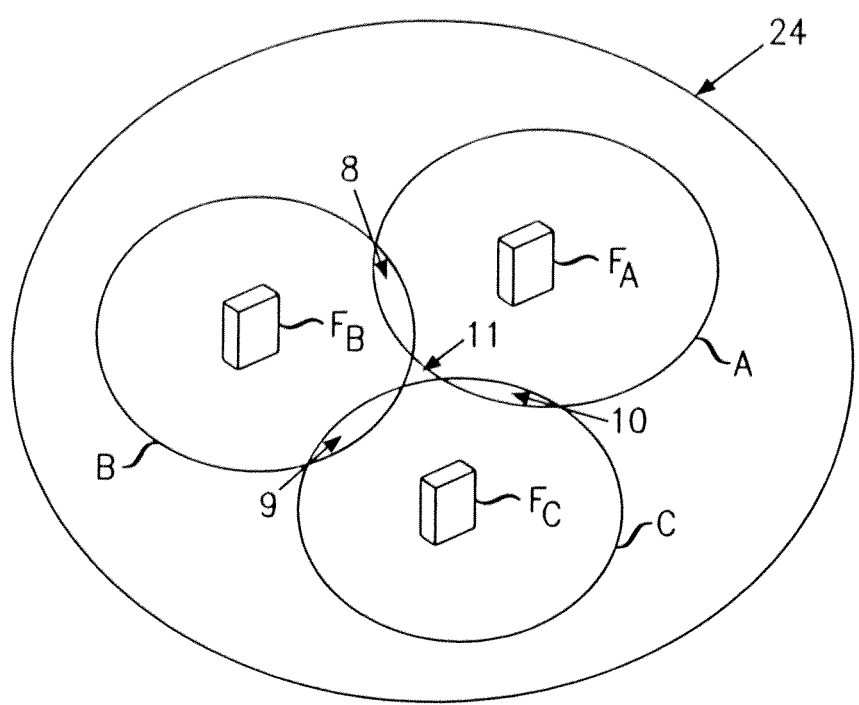
FIG. 3 illustrates in more detail a specific femto cell deployment within the wireless communications network of FIG. 1.

FIG. 3 illustrates a cluster or group of femto base stations $F_A$ to $F_C$ jointly providing coverage in an intended geographical area. The group of femto base stations form a wireless small cell network. The wireless small cell network is provided typically within an underlying macro cell 24. The underlying macro cell 2 is intended to cater for high mobility users and a wide geographical coverage area. The group of femto base stations forming the wireless small cell network is intended to provide local coverage to user equipment. When user equipment move between the different femto cells A to C forming the wireless small cell network, it is desired that the user equipment remains supported by those femto base stations and avoids being handed over to the underlying macro cell 24.

Each base station's coverage area is the geographical region where the transmitted signal can be received by a user equipments receiver at a signal strength which is greater than some specified threshold. Of course, the coverage will depend on may factors such as, for example, the transmission strength of the signal, the sensitivity of the receiver at the user equipment, the attenuation between the transmitter and the receiver, as well as any other noise or interference experienced. Hence, the area 11 is a coverage gap or hole where the received signal from each of the femto base stations is below that specified threshold. The overlap areas 8, 9, 10 denote those regions where the signal strength from two base stations in that region is greater than the specified threshold.

The technique disclosed herein seeks to perform optimisation within the wireless small cell network by varying the coverage area provided by each base station in a way which seeks to meet the following objectives. The first is to balance the user load amongst the co-located base stations to enable efficient utilisation of radio resources. The second is to minimise any radio coverage holes or gaps within the wireless small cell network. The third is to minimise any coverage overlap between neighbouring base stations; in other words to achieve the first two objectives with a minimum possible transmission power. Local status information available to each base stations is used to perform this optimisation. This information is obtained from measurement reports communicated back to the base stations by connected user equipment and/or from information provided by neighbouring base stations either directly or via a central node such as, for example, the femto controller/gateway 230. Each base station then makes use of this information and, based on predefined algorithms, makes a local decision to help the wireless small cell network collectively to better achieve those objectives. In particular, each base station performs frequent updates to its pilot channel transmission power to vary the coverage area of that base station, thereby adjusting the load on that base station and/or on neighbouring base stations.

Figure 4:
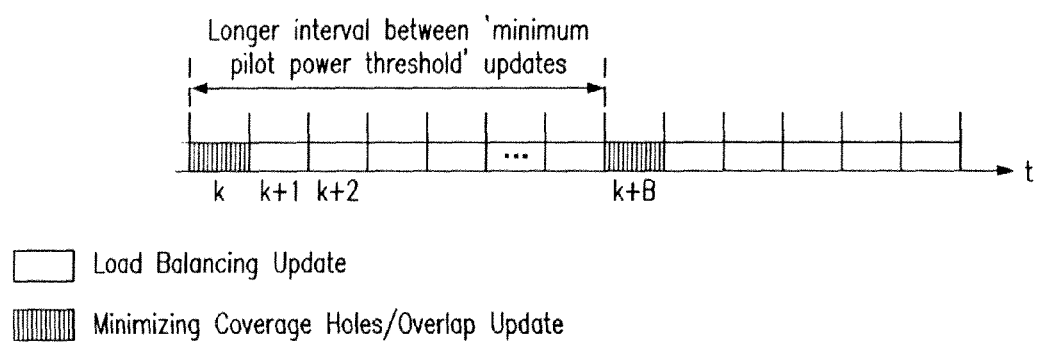
FIG. 4 illustrates schematically the update cycles.

Each base station stores thresholds for maximum pilot channel transmission power and minimum pilot channel transmission power. The maximum pilot channel transmission power threshold is fixed and depends on how much of the total base station transmission power is allocated to the pilot channel by the network designer. The minimum pilot power transmission threshold is set adaptively by the predefined algorithms. Pilot channel transmission power updates occur more frequently and adjust the level of the pilot channel transmission power within these two thresholds. Minimum pilot channel transmission power threshold updates occur less frequently, as illustrated schematically in FIG. 4.

Each base station, upon receiving user load information relating to neighbouring base stations, computes the average user load shared by those base stations. The difference between the base stations current load and the average load shared by the neighbouring base stations represents the target number of users to be adjusted within the base stations coverage area. The base station then, if appropriate, adjusts its pilot channel transmission power, and consequently its coverage, within the thresholds to acquire or handover the desired number of users to a neighbouring base station in order to rebalance the load, as will be described in more detail below.

Each base station also monitors the value of the coverage metric such as a metric incorporating a call drop probability and/or a coverage overlap coefficient and/or another quality of service metric over a specified amount of time. If the measured value of the specified metric exceeds a corresponding maximum allowable threshold, the base station's minimum pilot channel transmission power threshold is increased by a particular step size because exceeding the desired threshold indicates inadequate coverage. However, if the measured metric is less than the maximum allowable threshold, the base station's minimum pilot channel transmission power threshold is reduced gradually since greater than an adequate quality of service is being provided to user equipment and it may be that the base station can reduce its transmission power.

As shown in FIG. 3, each base station $F_A$, $F_B$, $F_C$ is operable to communicate and/or sense the neighbouring base stations within the group. To improve clarity of the following description and by way of example, the base station $F_A$ will be referred to as the "local" base station. The neighbouring base station $F_B$ and $F_C$ will the referred to as neighbouring base stations. The local base station $F_A$ is operable to perform pilot channel signal measurements to detect the neighbouring base stations that are located nearby either directly or through measurement reports. The local base station $F_A$ can also perform query and respond procedures over the backhaul network to obtain information about its neighbours either directly from those neighbouring base stations or from information stored centrally by the femto cell controller/gateway 230. In any event, the neighbouring base stations are those whose pilot channel power changes can have a significant impact on the local base station performance and visa versa.

As mentioned above, each base station periodically gathers information from supported user equipment and neighbouring base stations the base station then periodically adjusts its pilot channel transmission power lower threshold periodically to minimise coverage holes and any overlaps. Each base station also performs more frequently changes to its pilot channel transmission power within the set upper and lower thresholds to balance the load experienced between neighbouring base stations within the wireless small cell network, as will now be described in more detail.

Figure 5:
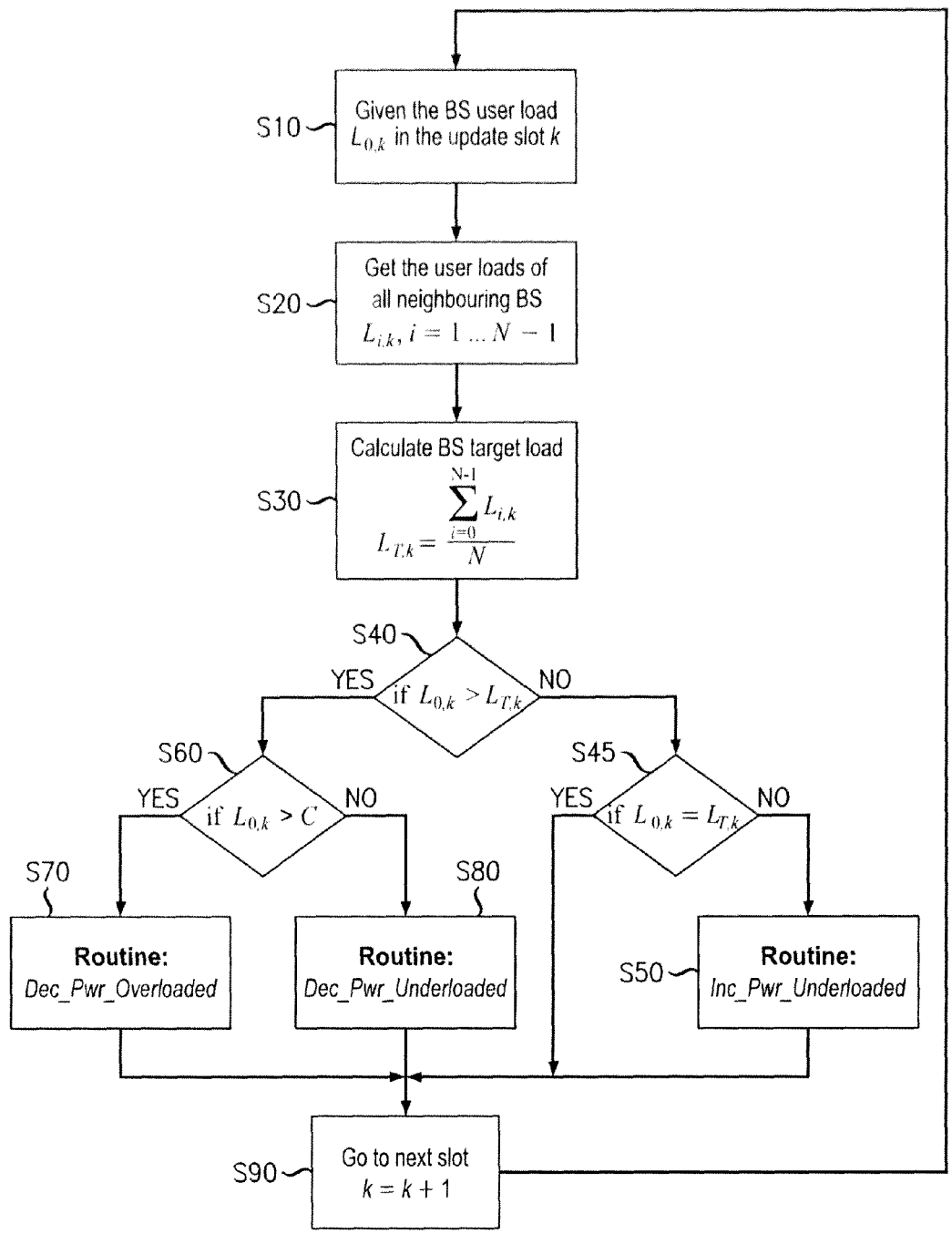
FIG. 5 is a flowchart illustrating the main processing steps of the load balancing updates.

FIG. 5 is a flow chart illustrating the operation of each base station when performing load balancing updates. As mentioned previously, these load balancing updates occur relatively frequently compared to the coverage updates illustrated in FIG. 6.

At step S10, the local base station determines the current user load $L_{0,k}$ (typically the number of active users being supported by the base station, but may also include other load metrics such as, for example, the transmission bandwidth being demanded by the supported users) in the current update slot, K.

At step S20, the local base station determines the loads $L_{i,K}$ of each of the neighbouring base stations, where i=1 to N-1, and N is the total number of base stations in a neighbour cluster or group (for example N is 3 in the example shown in FIG. 3).

At step S30, the local base station then calculates a base station target load in accordance with the algorithm $$L_{T,k} = \min\left(C, \frac{\sum_{i=0}^{N-1} l_{i,k}}{N}\right),$$

where $L_{T,k}$ is the target load for the local base station being currently updated in the slot K, C is the local base station capacity (typically the maximum number of active users supportable by that base station or some other load metric such as the maximum communications bandwidth supportable by that base station). This target load can then be used to provide an indication of whether the local base station is supporting more or less than the average load being supported by other base stations within the group.

At step S40, a determination is made as to whether the current user load $L_{0,k}$ on the base station is greater than the target load $L_{T,k}$ for that base station. If the current user load $L_{0,k}$ is less than the target load $L_{T,k}$ (meaning that the current user load is less than the maximum capacity of the base station C), then processing proceeds to step S45. At step S45, a determination is made as to whether the current user load $L_{0,k}$ on the base station equals the target load $L_{T,k}$ for that base station. If the current user load $L_{0,K}$ equals the target load $L_{T,K}$, then no changes to the pilot channel transmission power and processing proceeds to step S90. If the current user load $L_{0,k}$ is less than but not equal to the target load $L_{T,k}$ (meaning that the current user load is less than the maximum capacity of the base station C), then processing proceeds to step S50 where routine 3: Inc_Pwr_Underloaded (shown below) occurs because the base station is operating at less than the target level meaning that other base stations within the group are supporting a greater load and the local base station still has capacity to accept more load; the coverage area of the local base station is then increased by increasing the pilot channel transmission power to cause user equipment to handover from the more heavily loaded base stations within the group to the local base station, and processing proceeds to step S90. If the current user load $L_{0,K}$ is greater than the target load $L_{T,K}$, indicating that the base station is supporting greater than its share of load then processing proceeds to step S60.

At step S60, a determination is made of whether the current user load $L_{0,K}$ is greater than the capacity C of the local base station. If the current user load $L_{0,K}$ is greater than the capacity C of the local base station, then this indicates that the local base station is overloaded and needs to reduce its loading by handing-off user equipment; processing then proceeds to step S70 where routine 1: Dec_Pwr_Overloaded occurs. If the user load $L_{0,K}$ is less than or equal to the capacity C of the local base station then processing proceeds to step S80 where routine 2 Dec_Pwr_Underloaded occurs whereby the local base station seeks to reduce its transmission power, but only when it is possible to do so; accordingly a determination is made of whether other base stations within the group are able to carry that load before any power reduction occurs.

At step S90, processing returns to step S10 to calculate the user load in the next slot.

Routine 1: Dec_Pwr_Overloaded

1: For each connected mobile receiver, calculate its RPSS difference, i.e. $P_{rx}^{diff}$.
2: Sort, in ascending order, the calculated $P_{rx}^{diff}$ of all mobile receivers.
3: Store the sorted $P_{rx}^{diff}$ in an array $\mathfrak{R}$.
4: Decrease base station pilot transmission power by
   $P_{tx} = P_{tx} - \text{MEAN}[\mathfrak{R}(L_0 - C), \mathfrak{R}(L_0 - C + 1)]$.
5: if $P_{tx} < P_{tx,min}^{thr}$ then
6: $\quad P_{tx,min}^{thr} = P_{tx}$
7: end if
8: Go to Routine 2: Dec_Pwr_Underloaded.

Routine 2: Dec_Pwr_Underloaded

1: for i = 1 to ($L_0 - L_T$) do
2: $\quad$ For each connected mobile receiver, calculate its RPSS difference i.e. $P_{rx}^{diff}$.
3: $\quad$ Sort, in ascending order, the calculated $P_{rx}^{diff}$ of all mobile receivers.
4: $\quad$ Store the sorted $P_{rx}^{diff}$ in an array $\mathfrak{R}$.
5: $\quad$ Pick the mobile receiver $R_1$ with the lowest $P_{rx}$, i.e. $P_{rx,L}$.
6: $\quad$ Pick the mobile receiver $R_2$ with the lowest $P_{rx}^{diff}$, i.e. $\hat{P}_{rx,L}^{diff}$.
7: $\quad$ Calculate pilot power update as
   $P_{tx,u} = P_{tx} - \min(P_{tx,min}^{thr}, \text{MEAN}[\mathfrak{R}(1), \mathfrak{R}(2)])$.
8: $\quad$ if ($R_1$ is the same as $R_2$) then
9: $\quad\quad$ Pick the mobile receiver $R_3$ with the second lowest $P_{rx}$, i.e. $\hat{P}_{rx,L}$.
10: $\quad\quad$ if (($\hat{P}_{rx,L} - P_{tx,u}$) > $\eta$) then
11: $\quad\quad\quad$ For $R_2$, check the following:
12: $\quad\quad\quad\quad$ if (its next best base station is not a Macro) AND (its next best base station is not fully loaded) AND ($P_{rx}^{NB}$ > $\eta$) then
13: $\quad\quad\quad\quad\quad$ $P_{tx} = P_{tx} - P_{tx,u}$.
14: $\quad\quad\quad\quad$ else
15: $\quad\quad\quad\quad\quad$ Break.
16: $\quad\quad\quad\quad$ end if
17: $\quad\quad\quad$ else
18: $\quad\quad\quad\quad$ Break.
19: $\quad\quad\quad$ end if
20: $\quad\quad$ else
21: $\quad\quad\quad$ if (($P_{rx,L} - P_{tx,u}$) > $\eta$) then
22: $\quad\quad\quad\quad$ For $R_2$, check the following:
23: $\quad\quad\quad\quad\quad$ if (its next best base station is not a Macro) AND (its next best base station is not fully loaded) AND ($P_{rx}^{NB}$ > $\eta$) then
24: $\quad\quad\quad\quad\quad\quad$ $P_{tx} = P_{tx} - P_{tx,u}$.
25: $\quad\quad\quad\quad\quad$ else
26: $\quad\quad\quad\quad\quad\quad$ Break.
27: $\quad\quad\quad\quad\quad$ end if
28: $\quad\quad\quad\quad$ else
29: $\quad\quad\quad\quad\quad$ Break.
30: $\quad\quad\quad\quad$ end if
31: $\quad\quad\quad$ end if
32: end for Routine 3 Inc Pwr Underloaded
1: For each neighbour-connected mobile receiver, calculate its RPSS difference, i.e. $P_{rx}^{diff}$ between the own pilot signal and the neighbour BS's pilot signal.
2: Sort, in ascending order, the above-calculated RPSS differences, and store n array $\mathfrak{R}$.
3: Increase base station pilot transmission power by $P_{tx} = \min(P_{tx,max}^{thr}, P_{tx} + \text{MEAN}[\mathfrak{R}(L_T - L_0), \mathfrak{R}(L_T - L_0 + 1)])$.

Hence, it can be seen that a local base station employs algorithms to adjust its user load to that of the calculated mean of N neighbouring base stations. Given the current user load of the local base station, it collects via backhaul the user loads of its neighbours. It then computes the average load of the neighbour set (including its own load. Next, the local base station compares its current user load against the average load of the neighbour set, and decreases or increases its pilot transmission power to handover or acquire desired users, respectively. If the current user load is greater than its capacity (L0>C; the overloaded case), it employs the routine Dec_Pwr_Overloaded to drop the extra users. For the case (C. $L_0$>$L_T$), the local base station uses the routine Dec_Pwr_Underloaded, which drops a user only if it can be picked up by another femtocell. For the underloaded case ($L_0$<$L_T$), the routine Inc_Pwr_Underloaded increases the BS's pilot transmission power to acquire the required number of users ($L_T$-$L_0$).

As mentioned above, periodically, the minimum pilot channel transmission power threshold $P_{tx,min}^{thr}$ is varied to help minimise coverage holes and any overlaps. A coverage metric is measured over a certain predetermined amount of time and the base station compares the measured metric against a predetermined threshold and decides to increase or decrease the minimum pilot channel transmission power threshold accordingly. An increase in the minimum pilot channel transmission power threshold $P_{tx,min}^{thr}$ helps to remove coverage holes whilst a decrease in the minimum pilot channel transmission threshold $P_{tx,min}^{thr}$ helps to minimise any coverage overlaps. Typically, the decrease step size $\hat{P}_{step}$ will be set to be much lower than the increment step size $P_{step}$ to ensure that the base station coverage decreases gradually and that the coverage is dominated by the increment step. This is because coverage overlaps are less likely to adversely affect user equipment quality of service than coverage holes.

Figure 6:
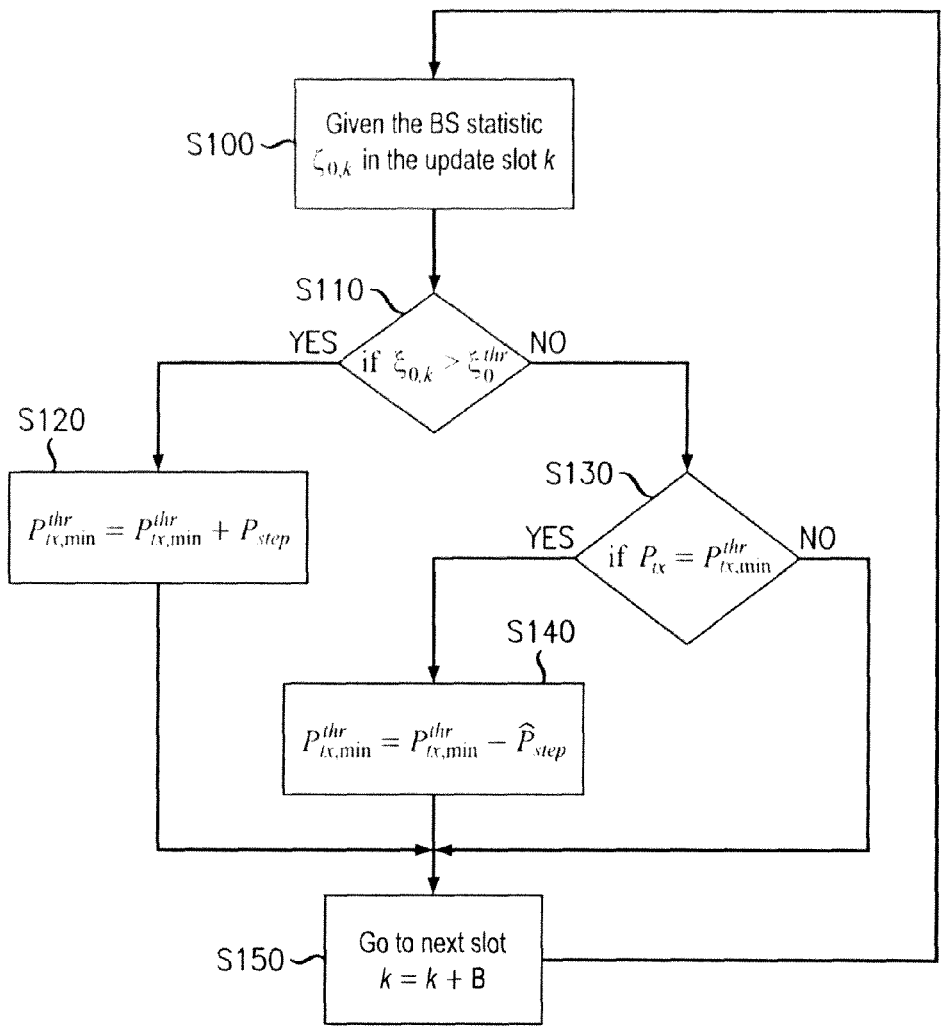
FIG. 6 is a flowchart illustrating the main processing steps of the coverage updates.

Turning now to FIG. 6, step S100, the coverage metric $\zeta_{0,k}$ is measured.

At step S110, a determination is made as to whether the measured coverage metric $\zeta_{0,k}$ exceeds the predetermined threshold $\zeta_0^{thr}$ or not. If the measured coverage metric $\zeta_{0,k}$ does exceeds the threshold $\zeta_0^{thr}$, indicating that an inadequate service is being provided to the user equipment, then the minimum pilot channel transmission power threshold $P_{tx,min}^{thr}$ is increased by a predetermined step $P_{step}$ as step S120. If it is determined at step S110 that the measured coverage metric $\zeta_{0,k}$ is less than or equal to the threshold $\zeta_0^{thr}$, then processing proceeds to step S130.

At step S130, a determination is made of whether the current transmission power $P_{tx}$ equals the minimum pilot channel transmission power threshold $P_{tx,min}^{thr}$. If it does not, then no changes are made and processing proceeds to step S150. If it is determined that the pilot channel transmission power $P_{tx}$ equals the minimum pilot channel transmission power threshold $P_{tx,min}^{thr}$ then, at step S140, the minimum pilot channel transmission power threshold $P_{tx,min}^{thr}$ is reduced by a predetermined step $\hat{P}_{step}$. Thereafter, processing proceeds step S150.

At step S150, further processing is suspended until the next update slot in B time periods.

Hence, it can be seen that in contrast to centralized approaches, decentralized/distributed algorithms are utilised which allow base stations to take local decisions to achieve a global objective. A decentralized joint coverage optimisation algorithm runs individually in each femtocell base station and works towards achieving user load balancing and minimization of coverage holes and overlap. Each base station stores thresholds for maximum pilot transmission power and minimum pilot transmission power. The maximum pilot power threshold is fixed and depends upon how much of the total base station transmission power is allocated to the pilot channel by the network designer. The minimum pilot power threshold is set adaptively by the algorithm. The algorithm, which runs individually at each base station, consists of two update cycles; a more frequent pilot power transmission update to achieve user load balancing and an infrequent minimum pilot transmission threshold update to handle coverage hole and overlap minimization. The reason for more frequent load balancing updates is to cater for the mobility of the users and to converge to a balanced load before the users' positions change.

Nomenclature:

N—The total number of base stations in a neighbor cluster, such that each base station has N-1 neighbors.

C—Base station capacity (e.g. maximum number of active users).

η—mobile receiver's receiver sensitivity.

$L_0$—User load (number of active users) for the base station currently updating.

$L_T$—Target user load for the base station currently updating.

$P_{tx,min}^{thr}$—Base station minimum pilot power threshold (adaptive).

$P_{tx,max}^{thr}$—Base station maximum pilot power threshold (fixed).

$\xi^{thr}$—Threshold for the coverage holes metric $\xi$.

$P_{rx}$—Received Pilot Signal Strength (RPSS).

$P_{rx,L}$—Lowest Received Pilot Signal Strength.

$P_{rx}^{B}$—Received Pilot Signal Strength from the best base station.

$P_{rx}^{NB}$—Received Pilot Signal Strength from the next best base station.

$P_{rx}^{diff} = P_{rx}^{B} - P_{rx}^{NB}$.

$P_{rx,L}^{diff}$—Lowest $P_{rx}^{diff}$.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A base station operable, in concert with other base stations within a group, to support wireless communications with user equipment, said base station comprising:

transmission logic operable to generate a cell having a coverage area supporting wireless communications with user equipment;

reception logic operable to receive load information indicative of a user equipment communications load experienced by base stations within said group; and coverage area adjustment logic operable to determine changes required to said coverage area within a predetermined range bounded by an upper and lower threshold to change a user equipment communications load experienced by at least one base station within said group;

wherein said coverage area adjustment logic is configured, when said user equipment communications load experienced by said base station is above an average user equipment communications load for said group and exceeds a predetermined maximum user equipment communications load supportable by said base station, to decrease said coverage area to decrease said user equipment communications load experienced by said base station; and wherein said coverage area adjustment logic is configured, when said decrease in said coverage area is to below said lower threshold, to reduce said lower threshold.

2. The base station as claimed in claim 1, wherein said coverage area adjustment logic is operable, when said user equipment communications load supported by said base station is below an average user equipment communications load for said group but fails to exceed a predetermined maximum user equipment communications load supportable by said base station, to increase said coverage area to no more than a maximum coverage area defined by said upper threshold of said predetermined range to increase said user equipment communications load experienced by said base station.

3. The base station as claimed in claim 1, wherein said coverage area adjustment logic is operable, when said user equipment communications load experienced by said base station is above an average user equipment communications load for said group but fails to exceed a predetermined maximum user equipment communications load experienced said base station and when base stations identified from said load information as being candidates to support user equipment communications load which would no longer be supported by said base station fail to exceed a predetermined maximum user equipment communications load supportable by those base stations, to decrease said coverage area to no less than a minimum coverage area defined by said lower threshold of said predetermined range to decrease user equipment communications load experienced by said base station.

4. The base station as claimed in claim 3, wherein said reception logic is operable to receive receiver sensitivity information indicative of a sensitivity of receivers of user equipment supported by base stations within said group and said coverage area adjustment logic is operable to determine from said receiver sensitivity information whether said decrease to said coverage area would cause user equipment communications load to no longer be supported by said base stations within said group and, if so, to prevent said decrease.

5. The base station as claimed in claim 1, wherein said load information indicative of a user equipment communications load experienced by base stations within said group comprises information indicative of numbers of user equipment supported by said base stations within said group and said coverage area adjustment logic is operable to determine changes required to said coverage area by changing its pilot channel transmission power to change said user equipment communications load experienced by at least one base station within said group by changing numbers of users supported by said at least one base station within said group.

6. The base station as claimed in claim 5, wherein said predetermined range bounded by an upper and lower threshold comprises a predetermined pilot channel transmission power range bounded by an upper pilot channel transmission power threshold and a lower pilot channel transmission power threshold.

7. The base station as claimed in claim 5, wherein said coverage area adjustment logic is operable, when said number of user equipment supported by said base station is below an average number of user equipment supported by base stations within said group but fails to exceed a predetermined maximum number of user equipment supportable by said base station, to increase said coverage area to no more than a maximum coverage area defined by said upper threshold of said predetermined range to increase said number of user equipment supported by said base station.

8. The base station as claimed in claim 5, wherein said coverage area adjustment logic is operable, when said number of user equipment supported by said base station is above an average number of user equipment supported by base stations within said group and exceeds a predetermined maximum number of user equipment supportable by said base station, to decrease said coverage area to decrease said number of user equipment supported by said base station.

9. The base station as claimed in claim 5, wherein said coverage area adjustment logic is operable, when said number of user equipment supported by said base station is above an average number of user equipment supported by base stations within said group but fails to exceed a predetermined maximum number of user equipment supportable said base station and when base stations identified from said information indicative of numbers of user equipment supported by said base stations as being candidates to support user equipment which would no longer be supported by said base station fail to exceed a predetermined maximum number of user equipment supportable by those base stations, to decrease said coverage area to no less than a minimum coverage area defined by said lower threshold of said predetermined range to decrease said number of user equipment supported by said base station.

10. The base station as claimed in claim 1, wherein said reception logic is operable to receive an indication of quality of service provided to user equipment supported by said base station and said coverage area adjustment logic operable to adjust said lower threshold of said predetermined range to vary said minimum coverage area definable by said predetermined range in response to said indication.

11. The base station as claimed in claim 10, wherein said coverage area adjustment logic is operable to perform at least one of:
when said indication of quality of service indicates that less than or equal to a predetermined quality of service is being provided to user equipment supported by said base station, to increase said lower threshold of said predetermined range by a first predetermined amount; and
when said indication of quality of service indicates that greater than a predetermined quality of service is being provided to user equipment supported by said base station, to decrease said lower threshold of said predetermined range by a second predetermined amount.

12. A method, comprising:
generating a cell having a coverage area supporting wireless communications with user equipment;
receiving load information indicative of a user equipment communications load experienced by base stations operating in concert with other base stations within a group to support wireless communications with user equipment; and
determining changes required to said coverage area within a predetermined range bounded by an upper and lower threshold to change a user equipment communications load experienced by at least one base station within said group;
when said user equipment communications load experienced by said base station is above an average user equipment communications load for said group and exceeds a predetermined maximum user equipment communications load supportable by said base station, decreasing said coverage area to decrease said user equipment communications load experienced by said base station; and
when said decrease in said coverage area is to below said lower threshold, reducing said lower threshold.

13. A non-transitory computer program product stored instructions, when executed on a computer, perform the method of claim 12.

* * * * *